June 23, 1964 W. N. WITTEBORG 3,138,261
DISPLAY RACK
Filed Oct. 14, 1963 3 Sheets-Sheet 1
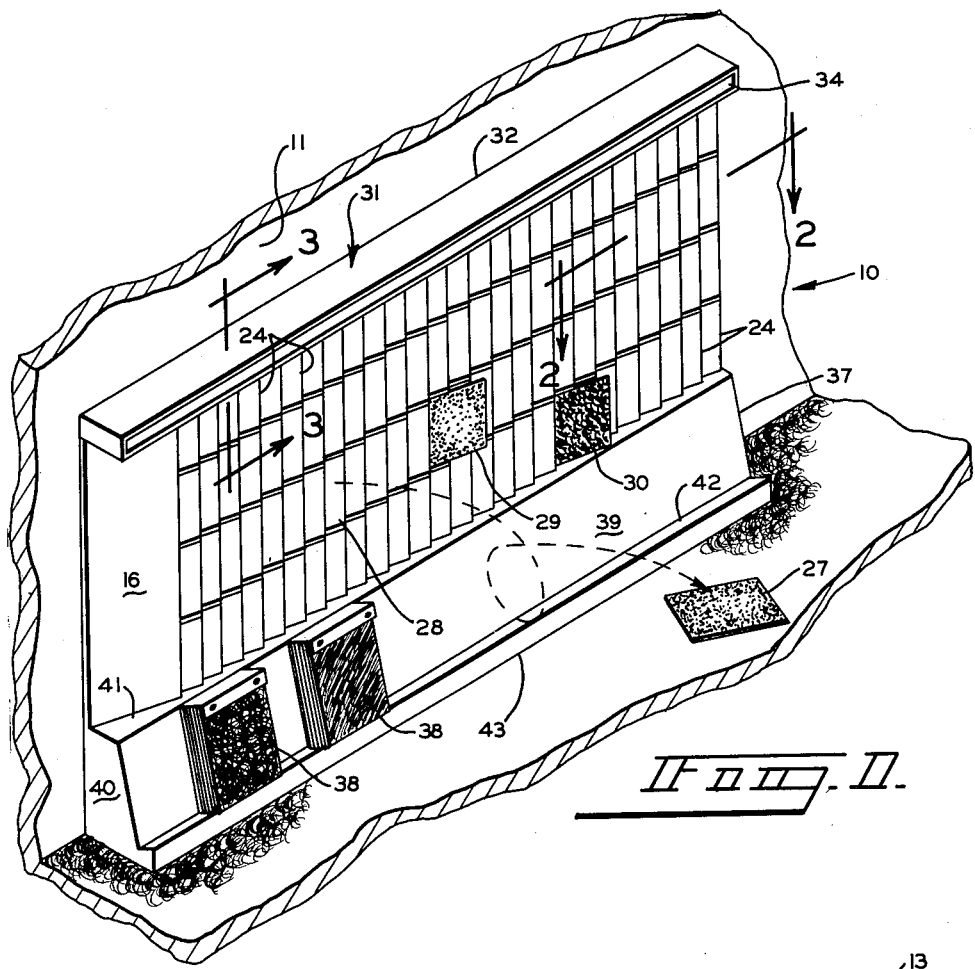
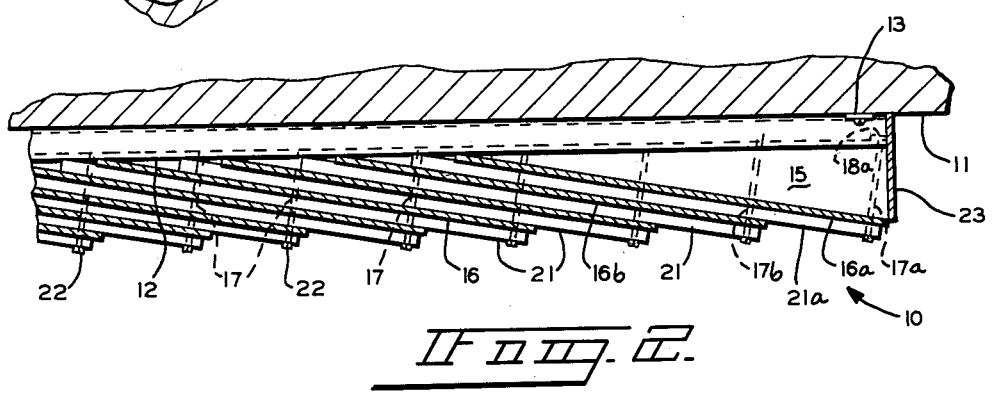
INVENTOR.
WILLIAM N. WITTEBORG
BY
Owen + Owen
ATTORNEYS

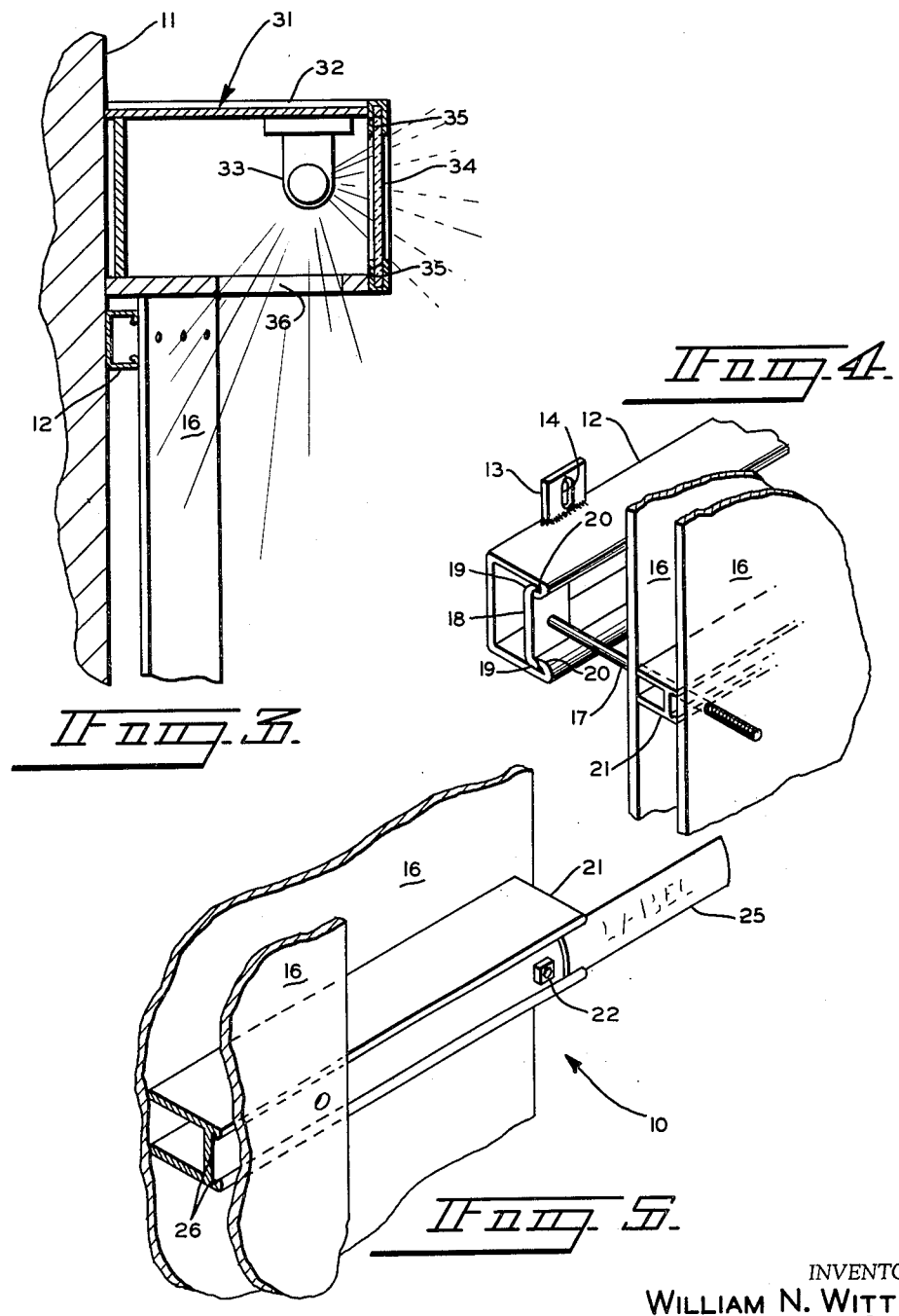

June 23, 1964  W. N. WITTEBORG  3,138,261
DISPLAY RACK
Filed Oct. 14, 1963  3 Sheets-Sheet 3
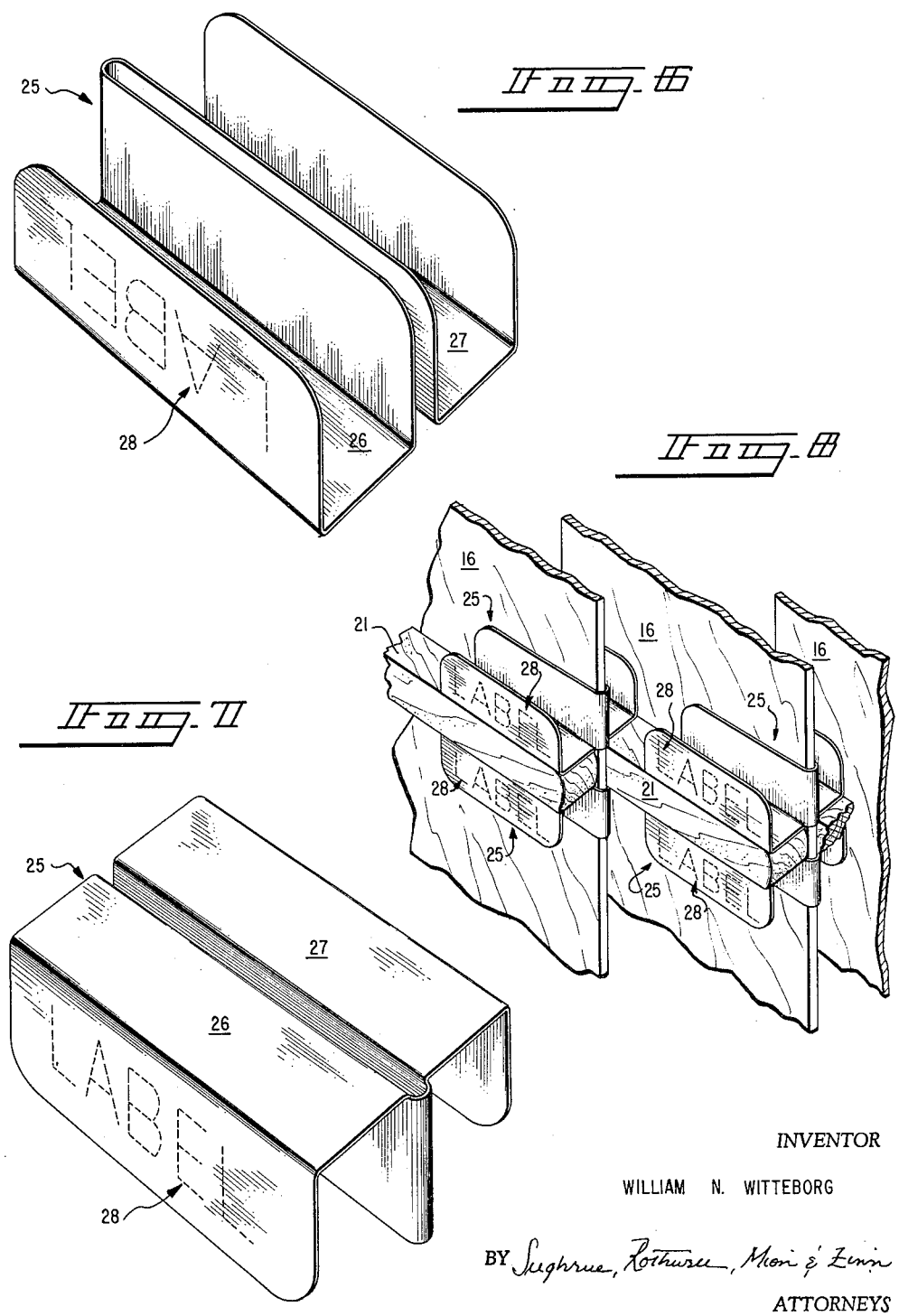
INVENTOR
WILLIAM N. WITTEBORG
BY Sughrue, Rothwell, Mion & Zinn
ATTORNEYS United States Patent Office 3,138,261
Patented June 23, 1964

3,138,261
DISPLAY RACK
William N. Witteborg, 321 West St.,
Columbus Grove, Ohio
Filed Oct. 14, 1963, Ser. No. 316,090
5 Claims. (Cl. 211—41)

This invention relates to a display rack and, more particularly, to a rack for displaying samples of generally flat materials, such as rugs, carpeting, or the like.

One method previously used in displaying samples, for example carpet samples, was to have the samples arranged in vertical stacks. This stacking procedure often created many problems. It was found that when a carpet sample was removed from a location near the bottom of the stack the weight of the samples located above the lower sample had a crushing effect on the lower sample, whereby some of the "sales appeal" was destroyed. If the sample stack were relatively large, the weight of the samples above the sample desired in itself created a problem when it was necessary for a salesman or a prospective customer to remove or lift the sample from the stack.

When the samples were displayed in a stack, the prospective customer could only see clearly the top sample in the pile. If the customer wanted to see some of the samples in the lower portion of the stack, or possibly compare two or more samples it was necessary for him either to observe the corners of a few of the samples or to remove or have the salesman remove the desired samples from the lower portion of the stack.

In prior art display racks problems often were encountered when the salesman wished to display a particular sample to a prospective customer by removing a sample from the rack and, for example, placing the sample on the floor. Because of the methods used in fastening the samples to many prior art display racks, the individual samples were not readily removable from the display rack for exhibition of this type. The methods used in fastening the samples to the display rack also made it very difficult to rearrange the samples when it was desired, for example, to arrange the samples by prices rather than by texture, or by color rather than some other system.

Prior art display racks also often created problems for salesmen and customers in easily identifying any particular sample by a manufacturer's number and price and problems in that samples could easily become shopworn. The display racks made no particular provision for easily displaying sample identification information so as to permit a customer to select a specific manufacturer or easily determine which samples might be within the desired price range. Further, the prior art racks often were conducive to unnecessary shop wear of the displayed samples. The corners of samples might become rolled, crushed, or tattered in such a manner as to effect the sales appeal of that particular sample.

This application is a continuation-in-part of my earlier filed, copending, application of the same title, Serial No. 201,523, filed June 11, 1962, now abandoned.

It is an object of the present invention to provide a novel display rack for the display of samples, for example, rug or carpet samples.

Another object of my invention is to provide a display rack whereby any individual sample may be readily removed.

Another object of my invention is to provide a display rack whereby samples can be displayed and readily rearranged according to any selected plan, such as quality, color, texture, or price.

Another object of my invention is to provide a display rack in which samples may be displayed with readily visible identifying information, such as a manufacturer's name and price.

Still another object of my invention is to provide a display rack in which unnecessary shop wear of samples is avoided.

Further objects of this invention will become apparent from the following specification and drawings in which:

FIG. 1 is a front quarter view in perspective showing a display rack embodying the invention;

FIG. 2 is a horizontal sectional view taken along the line 2—2 of FIG. 1 and shown on an enlarged scale;

FIG. 3 is a fragmentary vertical sectional view taken along the line 3—3 of FIG. 1 and shown on a further enlarged scale;

FIG. 4 is a fragmentary, perspective view showing details of a construction for mounting display panels;

FIG. 5 is a fragmentary, perspective view of two overlapping display panels and a spacing member therefor;

FIG. 6 is a perspective view of a sample identification tab;

FIG. 7 is another view of a sample identification tab; and

FIG. 8 is a perspective view showing tabs of FIG. 6 in position on the display rack of FIG. 1.

Briefly, the present invention is a display rack for the display of a plurality of samples, for example, rug or carpet samples of substantially the same size. The rack comprises a series of support members, for example, Masonite panels. The panels are horizontally overlapping and are spaced from and parallel to each other. Horizontal spacers extend between the individual panels and serve the dual purpose of first, holding the panels in spaced relationship to each other and second, supporting the individual carpet samples.

A preferred embodiment of the invention is shown in the drawings with a display rack being generally indicated at 10. The display rack 10 is illustrated as being fastened to a wall 11 but it could be supported equally as well by other means, for examples, the back of a similar display rack, a steel channel member, support pipes, etc., from either a wall or a floor. An upper channel member 12 is fastened to the wall 11 by connecting clips 13 and anchor bolts or other suitable fastening means and a similar lower channel member (not shown) is similarly fastened in place. The clips 13 have vertical slots 14 so that the channel members 12 may be adjusted vertically and levelled.

Referring to FIG. 2, horizontal wedge-shaped filler pieces 15 mounted on the channel members 12 are utilized for backing up the front of a series of support panels 16 which are mounted in horizontally overlapping, parallel relationship with each other. The filler pieces 15 determine the horizontal angle of the panels 16 with respect to the wall 11. The panels 16 (FIG. 4) are connected together by bolts 17, the bolts 17 having rectangular heads 18. The heads 18 have turned-in edges 19 which engage with return lips 20, on the channel members 12.

The panels 16 are spaced from each other by spacing members 21, there being three such spacing members 21 shown in FIG. 1 for each panel 16 in order to provide vertically spaced supports for the samples. Of course, in other embodiments, a greater or lesser number of members 21 may be employed and their vertical spacing selected to match the vertical dimensions of the samples.

A rack 10 as described above is assembled by positioning the heads 18a of a first vertical row of bolts 17a (FIG. 2) in the channel members 12. The wedge filler pieces 15 are then slid onto the bolts 17a and next adjacent bolts 17b. The first Masonite support panel 16a has suitably spaced holes for sliding over the bolts 17 and is now placed against the wedge filler pieces 15. The first set of spacing members 21a is next placed on the bolts 17a, 17b, etc. The assembled components are secured by threading a nut 22 upon the threaded end of the bolts 17a, 17b, etc. A second Masonite support panel 16b is then placed on the bolt 17b and following in staggered relationship with the first panel 16a as shown in FIG. 2, and the assembly process as above described is continued until the entire group of panels 16 and spacing members 21 has been assembled. An end cap 23, see FIG. 2, is attached to the ends of the wedge filler pieces 15 to provide a more pleasing appearance.

As shown in FIG. 5, the spacing members 21, also serve the purpose of providing the tops and bottoms of "pockets" for the insertion of display samples 24. The support panels 16 provide the sides for the display sample pockets.

As shown in FIG. 1, a plurality of the display samples 24 readily can be observed by prospective customers. When desired, any individual sample, such as the sample 27, may be removed from its pocket and placed upon the floor for customer inspection. Removal of the individual sample 27 results in an empty space 28, in the display rack, the empty space 28 being readily apparent to anyone observing the display. Samples indicated by the reference numbers 29 and 30 are shown as partly removed from the interior of their pockets so that greater areas of the samples 29 and 30 can be observed by the prospective customer.

In order to provide for easily visible display of sample identification information, such as a manufacturer's name and price, I provide a tab member 25 as illustrated in FIG. 6. This tab member 25, which may be formed from any suitable material such as aluminum or a plastic, is formed with two channel member arms 26, 27, each in the form of an extended box-like shape open on one side. Two of the side walls of the channel arms are joined, and the channel arms are then bent around this juncture point. As finally formed, the two adjacent channel arms are substantially parallel and are resiliently urged together so as to grip any material introduced between the arms. The outside wall surfaces of the channel arms provide a planar surface 28 upon which sample identification information may be displayed, as will now be disclosed.

When a rack 10 as described above is to be placed in use, tabs 25 are placed on the exposed edge of each Masonite support panel 16, as illustrated in FIG. 7. The resilient urging toward each other of the inside walls of the channel arms causes the tabs to grip the Masonite support panels and be held in proper position against accidental dislodgment. The exposed outer wall surface 28 of one channel arm provides an easily available surface upon which any suitable sample identification information may be displayed.

Further, the tabs operate to preclude the possibility of excessive shop wear of the displayed samples. As may be noted, the channel arm 28 of each tab which extends along the outer surface of each Masonite support panel 16 forms essentially a continuation of the surface of the next adjacent overlapping Masonite support panel. This extending surface protects the corners of the displayed samples, so as to effectively prevent undue distortions and shop wear of the corners of the sample.

In the present embodiment of this invention, a lighting means, generally shown at 31, is included. As best shown in FIG. 3, the lighting means 31 consists of a lighting soffit 32, in which is fixtured a fluorescent light 33, or some other type of light source. A translucent strip 34 is placed in slots 35, which are provided in the lighting soffit 32. The translucent strip 34 may be used for displaying advertising or for identifying different sections of samples according to texture, price, etc. Light rays from the fluorescent light 33 pass through an aperture 36 and provide illumination upon the display samples 24.

Referring particularly to FIG. 1, a book rack 37 is provided for the display of samples which are bound together and are referred to as "sample books." The sample rack 37 consists of a back panel 39, end panels 40, top panel 41, support ledge 42, and "kick" board 43. The back panel 39, which is sloped at an acute angle relative to a vertical plane, supports the sample books 38, the sample books resting upon the support ledge 42.

This display rack, therefore, allows a salesman to remove easily either a group of samples which are bound in a sample book or individual samples from the top portion of the display rack. The display of samples in this display rack enhances the appearance of a merchant's store and also saves time both for the salesman and the prospective customers who readily can inspect large numbers of samples at a glance.

I claim:

1. A rack for the display of a plurality of generally flat, rectangular, samples of substantially identical size, comprising:
   a plurality of vertically extending generally planar support members,
   a plurality of vertically spaced horizontally extending spacer members,
      at least three of said spacer members being mounted on each of said support members, said spacer members being thicker than the thickness of said samples,
      said spacer members being separated vertically on said support members a distance greater than the vertical height of said samples,
   means for mounting said support members in a horizontally overlapping, parallel relationship,
      each successive support member being positioned against the spacer members on the next preceding support member,
   means for positioning at least one of said support members in acute horizontal, angular relation to a vertical plane, and tab members engaging the exposed edges of each of said support members adjacent said spacer members.

2. A rack as claimed in claim 1, in which said tab members display sample identification information.

3. A rack as claimed in claim 1, in which each of said support members is a thin, solid panel and said spacers are interleaved therewith.

4. A rack as claimed in claim 1, in which the means for positioning said support members comprises acute, wedge-shaped, horizontal elements lying between the first of said panels and a vertical plane.

5. A rack as claimed in claim 1, in which said tab members encompass the edge and corner portions of samples displayed in said rack.

References Cited in the file of this patent

UNITED STATES PATENTS

| 116,306 | Hearn | June 27, 1871 |
| 1,525,318 | Payzant | Feb. 3, 1925 |
| 1,652,411 | Randleman | Dec. 13, 1927 |
| 2,303,971 | Willy et al. | Dec. 1, 1942 |
| 2,314,473 | Barlow | Mar. 23, 1943 |
| 2,356,688 | O'Reilly | Aug. 22, 1944 |
| 2,564,517 | Beals | Aug. 14, 1951 |
| 2,639,040 | Tapley | May 19, 1953 |
| 2,754,974 | Larson | July 17, 1956 |